United States Patent [19]
Jatnieks

[11] Patent Number: 5,519,295
[45] Date of Patent: May 21, 1996

[54] ELECTRICALLY OPERATED ACTUATOR HAVING A CAPACITOR STORING ENERGY FOR RETURNING THE ACTUATOR TO A PREFERRED POSITION UPON POWER FAILURE

[75] Inventor: Girts U. Jatnieks, Minneapolis, Minn.

[73] Assignee: Honeywell Inc., Minneapolis, Minn.

[21] Appl. No.: 223,625

[22] Filed: Apr. 6, 1994

[51] Int. Cl.⁶ .............................. H02P 1/26; G05F 1/613
[52] U.S. Cl. .............. 318/453; 318/135; 361/71; 361/54; 307/66
[58] Field of Search ........................... 318/453, 452, 318/445, 454, 280, 283, 286, 135; 361/59, 67, 76, 71; 307/64, 66, 67; 323/222, 272, 318, 350

[56] References Cited

U.S. PATENT DOCUMENTS

| | | |
|---|---|---|
| 3,890,494 | 6/1975 | Meshek et al. . |
| 3,984,753 | 10/1976 | Uchida et al. ........................... 321/47 |
| 4,321,661 | 3/1982 | Sano . |
| 4,408,607 | 10/1983 | Maurer . |
| 4,423,364 | 12/1983 | Kompelien et al. . |
| 4,451,743 | 5/1984 | Suzuki et al. . |
| 4,481,449 | 11/1984 | Rodal ...................................... 318/138 |
| 4,560,887 | 12/1985 | Schneider . |
| 4,607,205 | 8/1986 | Kito et al. ................................ 318/778 |
| 4,634,953 | 1/1987 | Shoji et al. . |
| 4,653,931 | 3/1987 | Takeda . |
| 4,714,352 | 12/1987 | Ganter . |
| 4,751,653 | 6/1988 | Junk et al. .............................. 361/76 |
| 4,795,914 | 1/1989 | Higa et al. . |
| 4,833,376 | 5/1989 | Shimura .................................. 318/286 |
| 4,890,003 | 12/1989 | Seibert et al. . |
| 5,012,121 | 4/1991 | Hammond et al. . |
| 5,021,679 | 6/1991 | Fairbanks et al. ....................... 307/66 |
| 5,278,454 | 1/1994 | Strauss et al. . |

Primary Examiner—John W. Cabeca
Attorney, Agent, or Firm—Edward L. Schwarz

[57] ABSTRACT

An electrically operated actuator stores power in a capacitor for returning the actuator output element to a preselected position upon power failure. The actuator has a controller having input power terminals connected across the capacitor and control terminals for controlling the power applied from the input power terminals to the motor which comprises the actuator's prime mover. A sensor monitors the presence of power provided to the controller's input power terminals. When failure of this power is sensed, the capacitor current flows to the controller, and the sensor applies signals to an override circuit of the controller causing the controller to apply current from the capacitor to the actuator motor in a way which drives the actuator toward the preselected position. A properly selected capacitor is capable of supplying adequate current over a period of time sufficient to return the actuator to the preselected position.

11 Claims, 2 Drawing Sheets

ELECTRICALLY OPERATED ACTUATOR HAVING A CAPACITOR STORING ENERGY FOR RETURNING THE ACTUATOR TO A PREFERRED POSITION UPON POWER FAILURE

BACKGROUND OF THE INVENTION

Mechanical actuators are used in a variety of applications for controlling the operation of various mechanical components or devices in systems. The term actuator here is used to denote an apparatus which has an electrically powered drive mechanism providing mechanical power to an output element which applies the mechanical force for operating the component. The output element is continuously movable toward either of first and second extreme positions responsive to electrical actuator power of first and second types respectively supplied to the drive mechanism. These actuators have a power supply of some type which provides electrical power across first and second power terminals. These actuators also have a control circuit or controller receiving electrical power from the power supply's power terminals for selectively converting electrical power from the power supply responsive to an externally provided control signal, into electrical actuator power of the first and second types. The controller supplies to the drive mechanism the type of electrical actuator power which drives the output element in the direction desired.

The description following is intended to address both linear and rotary actuators, and the invention can easily be applied to both. Those familiar with the principles of kinetics understand that it is easy to transform linear force into torque and torque into linear force by the use of a rack and pinion, a cam and follower, or a crank arm. In a typical actuator, the drive mechanism includes an electric motor and a gear train of some kind for multiplying the force or torque available from the motor which is to be supplied as the actuator's output. The output element of rotary actuators will typically have a maximum rotation of less than one complete revolution. Rotary actuators now available for controlling devices such as valves and air dampers use small electric motors which drive through speed reduction gear trains having a ratio of a thousand to one or more. Thus, to move the actuator output element from one extreme excursion to the other, a motor having a shaft speed of a few thousand RPM will typically have to run for a few tens of seconds.

There are many different types of systems which employ these actuators. For example, burner systems have fuel valves and air supply dampers for controlling the flow of these fluids to the burner's combustion chamber. Actuators are customarily used to operate these components. Chemical plant systems frequently have large numbers of actuator-operated valves for controlling flow of fluids by which the processes of these plants are implemented. In most of these systems, a system controller prescribes a sequence of operation for the system components including the actuators. The controller commands the actuators to operate the components which they control at selected times. If the sequence and timing of operation for actuators is not properly executed, there may well be safety and quality implications for the system. For example, it is well known that if the fuel control valves of a burner system are not closed and opened at the proper times, potentially dangerous conditions may result.

In many systems, the actuators each have a setting or position which provides for safety or prevents damage should the operating sequence be interrupted. One example might be in burners, where if the controller fails, it is important to immediately close the fuel valves. A frequent cause of controller failure is loss of power for the system. Such situations may arise because of a generalized blackout involving the electrical mains, a tripped circuit breaker, or a failure of the actuator's power supply. This situation has particular implications for electrically powered actuators since once electrical power is lost, electrical power is no longer available to operate the components which they control. In the past this situation has been addressed by providing an alternative energy store such as a spring or battery which provides power for returning the component to its safety position when power to the actuator is lost. Newer actuator designs use a capacitor instead of a spring to store energy for returning the controlled component to its safety position when power is lost.

Capacitors have been used for interim power supplies in a variety of systems for a long time. One common example is the use of a capacitor to provide bridge power to the station frequency memory during battery replacement in small portable radios of the type having synthesized tuning. This avoids the need each time the batteries are replaced, for the user to reprogram the possible 10 or 15 station frequencies previously recorded in the memory. There are also actuators now described in the literature which use a capacitor to provide interim power in the case of a power outage. These actuators use a separate charging circuit for the capacitor, and an automatically operated power switch to select either the normal power supply or in the case of a power outage, the capacitor as the source for the motor current.

BRIEF DESCRIPTION OF THE INVENTION

An alternative design avoids the need for a separate capacitor charging circuit and a separate switch for selecting the motor current source. Such an alternative design is compatible with electrically operated actuators of the type mentioned above which have a) a power supply having first and second power output terminals, and which provide thereat, electrical power for the actuator drive mechanism, and b) a control circuit receiving electrical power from the power supply's power output terminals for selectively converting electrical power from the power supply responsive to an externally provided control signal, into electrical actuator power of the first and second types and for supplying the electrical actuator power to the drive mechanism.

The improvement includes a diode junction having first and second terminals, with the first terminal connected to the power supply's first power output terminal. A capacitor is connected between the diode junction's second terminal and the power supply's second power output terminal. Conductors provide power present at the capacitor terminals to the control circuit. A sensor is connected to detect presence of power supplied by the power supply, and provides a power outage signal responsive to absence of power at the power supply's power terminals. The control circuit is further modified to include an override circuit which receives the power outage signal. Responsive to the power outage signal, the control circuit overrides whatever is selected by the control signal, and instead supplies current from the capacitor as power of the first type to the drive mechanism. This change in the design seems to minimize the parts count. I believe these changes have the potential to reduce cost and improve reliability of the actuators which incorporate them.

DESCRIPTION OF THE PREFERRED EMBODIMENTS

Figure 1:
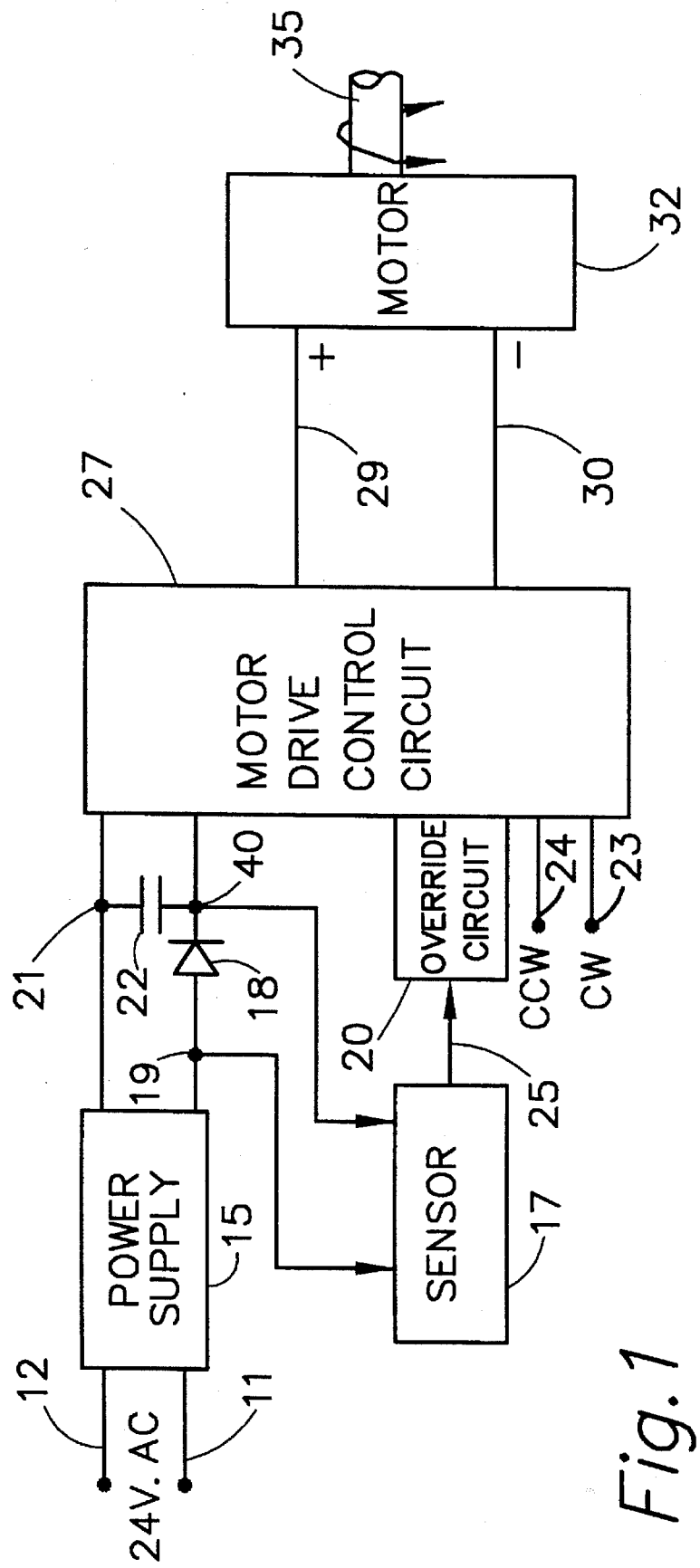
FIG. 1 is a block diagram of the major components of an actuator incorporating the invention.

In the block diagram of FIG. 1, a power supply 15 receives 24 volt AC power at terminals 11 and 12. A smoothed and regulated DC voltage is provided across first and second power output terminals 19 and 21, with terminal 19 at a higher voltage potential than terminal 21. First power output terminal 19 is connected to the anode of a diode 18 which serves as a diode junction. The cathode of diode 18 is connected to a power input terminal 40 of a motor drive control circuit 27 through which is provided electrical power to a motor 32. A power storage capacitor 22 is connected between terminals 21 and 40. A sensor element 17 has input terminals connected to terminal 19 and terminal 40. When sensor 17 detects that voltage at terminal 19 has fallen below that at terminal 40, then sensor 17 provides a power outage signal on connector 25 to an override circuit 20. Override circuit 20 may be considered to be a part of control circuit 27.

Motor 32 is in this embodiment a DC motor having a shaft 35 whose direction of rotation depends on the type of the power voltage provided on paths 29 and 30. A first type of power voltage causes motor 32 to rotate its output shaft 35 in a counterclockwise direction, and is defined as the case where path 29 carries a DC voltage positive with respect to path 30 voltage. A second type of power voltage, where path 30 carries a DC voltage positive with respect to path 29, causes motor 32 to rotate its shaft 35 in a clockwise direction. Shaft 35 is typically connected to a reduction gear train Of the type discussed in the Background section above. In other types of motors, direction of rotation may be controlled by other characteristics of a non-DC power voltage. At any rate, motor 32 should be chosen to provide an amount of speed and torque allowing the actuator of which it forms a part to provide the required maximum level of torque output and the proper speed of operation for the controlled device. The power supply 15 should be able to provide at least the current and voltage required for this speed and torque. The power supply 15 should be sized to provide motor 32 with electrical power of the appropriate voltage and have tile necessary current capacity for rated torque output. Preferred designs for a motor 32 require current input in the range of 25 to 100 ma. and a voltage range of 10 to 20 volts. Capacitor 22 is chosen with a size sufficient to provide current at such a voltage for several tens of seconds when charged to the open circuit voltage of power supply 15. Such current flows and durations require a capacitance for capacitor 22 in the range from about one-half to two or three farads. These larger sizes of capacitors are typically now available in only 5.5 or 11 v. types, so to get the desired voltage and capacitance rating, a number of capacitors must be connected together in a series-parallel arrangement according to well known principals of electrical theory.

Control circuit 27 receives a control signal on paths 23 and 24 which specifies whether power is to be supplied to the motor 32 or not, and the type of power to be supplied to motor 32. In one embodiment of this invention, when a positive voltage potential is applied to terminal 24, the power voltage from terminals 21 and 40 is switched internally by control circuit 27 to make path 29 positive with respect to path 30 so that motor 32 will rotate its shaft 35 counterclockwise. When a positive voltage is applied to path 23 and zero volt is applied to path 24, or path 24 is allowed to float, control circuit 27 switches the power voltage to make path 30 positive with respect to path 29, and motor 32 to rotate its shaft 35 clockwise.

When power is applied to terminals 11 and 12 of power supply 15, the DC voltage provided on terminal 19 not only provides power to control circuit 27, but also charges a capacitor 22 connected between terminal 40 and terminal 21. After capacitor 22 has been completely charged, it becomes essentially invisible to the system as long as power from power supply 15 is present at terminals 19 and 21. Should power be lost at terminals 19 and 21, voltage at terminal 19 will fall very quickly to near zero volt, back biasing diode 18 because of the voltage on capacitor 22 which its charge maintains. In response, sensor 17 provides the power outage signal on path 25 to override circuit 20. Override circuit 20 simulates a counterclockwise direction control signal on paths 23 and 24 within control circuit 27, causing control circuit 27 to provide power of the first type to motor 32, which will be recalled as the condition of path 29 positive with respect to path 30. This first type of power is supplied by capacitor 22 for so long as sufficient charge remains on it after which the motor 32 ceases rotating its shaft 35 due to lack of power. As was discussed above, the size of capacitor 22 should be large enough to assure that sufficient current will flow for the entire time required for motor 32 to return the controlled component or device to its safety position. In this way, it is possible for a motor 32 which forms a part of an actuator to be driven in a preselected direction upon loss of power to the actuator, allowing the actuator to return the device which it controls to a preferred position.

Figure 2:
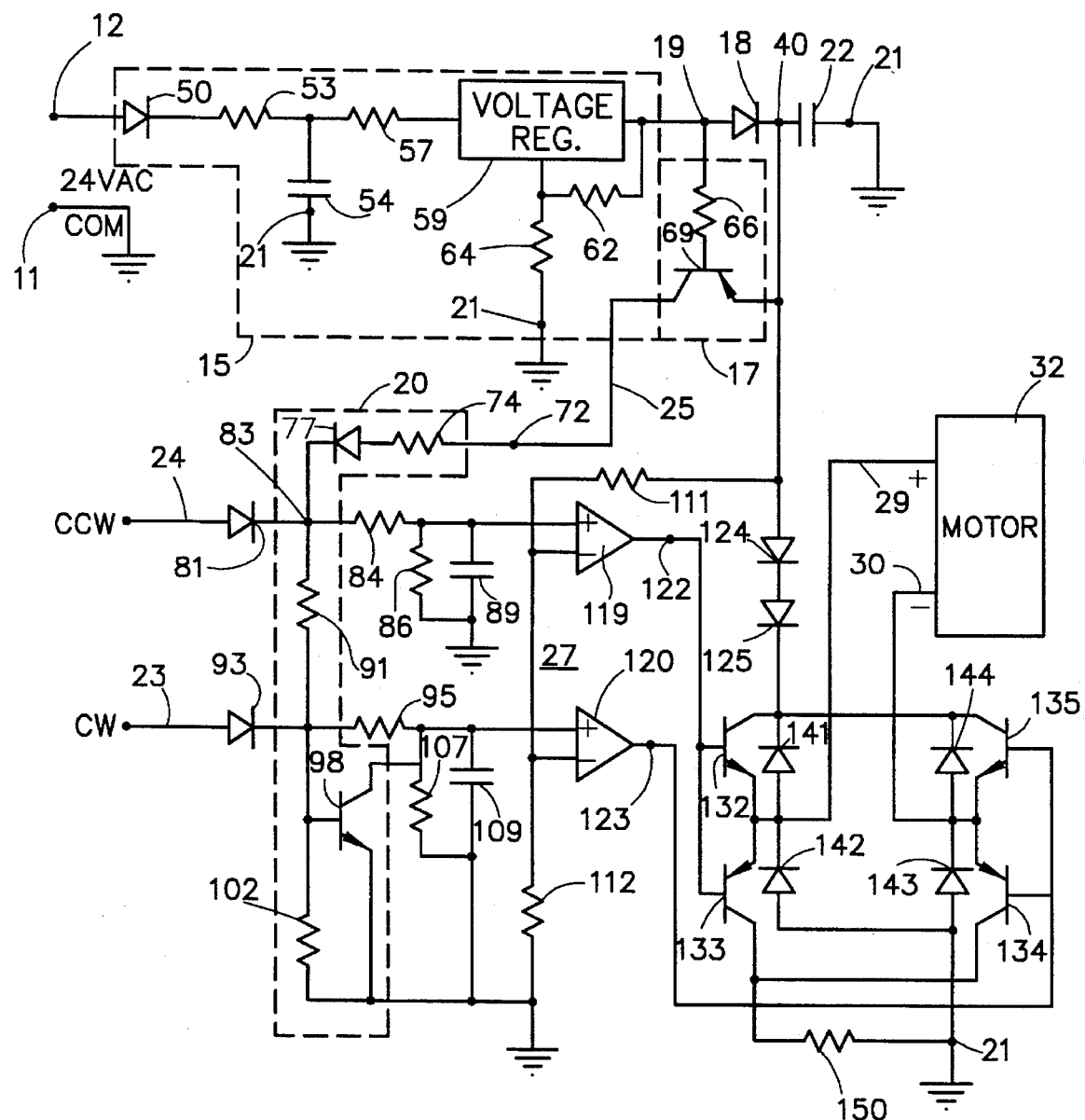
FIG. 2 is a circuit schematic in which the invention is incorporated.

In the detailed schematic of FIG. 2, the individual subsystems providing inputs to the control circuit 27 have been enclosed in dashed lines. Turning first to power supply 15, a diode 50 receives AC voltage from terminal 12 at its anode and provides half wave rectified DC voltage to a first terminal of a resistor 53. Resistor 53 along with a second series resistor 57 and a filter capacitor 54 form a smoothing circuit which removes some of the ripple from the voltage provided by diode 50. A voltage regulator 59 along with resistors 62 and 64 further smooths and regulates the voltage and provides to terminal 19 a DC voltage of a fixed level and having only a very small ripple.

It is next helpful to briefly discuss the operation of the motor drive control circuit, which comprises all of the components shown in FIG. 2 which are not within one of the spaces enclosed with dotted lines. When it is desired to drive motor 32 in the counterclockwise direction, 24 volts AC is applied to counterclockwise drive path 24 and zero volt is applied to path 23, or path 23 is allowed to float. When it is desired to drive motor 32 in a clockwise direction, voltages of the opposite sense are applied to paths 23 and 24. When no movement of motor 32 is desired, zero volt is applied to both paths 23 and 24. When 24 volts AC is applied to one of the paths 23 and 24, the voltage is rectified by the diode 81 or 93 receiving the voltage and then applied to the one of the voltage dividers comprising either resistors 84 and 86 or resistors 95 and 107. The reduced voltage from the voltage divider involved is partially filtered by capacitor 89 or 109 and applied to the +input terminal of comparator 119 or 120. Comparators 119 and 120 receive their operating power from terminal 40. A voltage divider comprising resistors 111 and 112 applies a DC voltage to the −input terminal of both comparator 119 and 120. The resistors 111 and 112 are chosen such that the voltage on a −terminal of comparators 119 or 120 is less than the voltage created at the +terminal of comparator 119 or 120 by a 24 volt AC signal on path 23 or 24. As is well known, a comparator 119 or 120 will provide as an output signal at terminal 122 or 123, a positive DC voltage level slightly below the Operating power voltage provided by terminal 40, when the comparator's +input terminal is positive with respect to its −input terminal. When such a comparator's −input terminal is positive with respect to its +input terminal, the output terminal provides a voltage of approximately zero volt.

Accordingly, one can see that the output of comparator 119 is a positive DC voltage and the output of comparator 120 is zero volt when 24 volts AC is applied to path 24 and zero volt is applied to path 23. When the voltages applied to paths 23 and 24 are reversed then the voltages provided by output terminals 122 and 123 are similarly reversed. The voltages provided by output terminals 122 and 123 control the conduction states of the transistors 132–135 which are wired in a bridge configuration. When a positive voltage is present on output terminal 122 and zero volt is present on output terminal 123, transistors 132 and 134 conduct, and power path 29 connects to the positive voltage at terminal 40 through diodes 124 and 125. By convention, this polarity of motor 32 power is power of the first type and causes output shaft rotation in the counterclockwise direction. When a positive output voltage is present on path 123, then transistors 133 and 135 conduct, and path 30 is connected thereby to the positive voltage at terminal 40, causing clockwise rotation of motor 32. Diodes 141–144 provide protection for transistors 132–135 against the inductive surge which results when power is removed from motor 32. Diodes 124 and 125 place the collectors of transistors 132 and 135 at approximately 1.2 volts below the voltage at terminal 40, allowing the voltage provided by comparators 119 and 120 to drive transistor 132 or 135 into saturation. Resistor 150 provides a connection to ground for the collectors of transistors 133 and 134, and limits the current supplied to motor 32.

The capacitor 22 connected between terminal 40 and ground (terminal 21) is charged by the current flow from voltage regulator 59. During normal operation, the current supplied by power supply 15 charges capacitor 22 through diode 18 to one diode drop below the maximum voltage provided by power supply 15. Diode 18 provides a diode junction across which is present a voltage indicating presence or absence of power at terminal 19. Whenever the voltage at terminal 40 exceeds the voltage at terminal 19, then it can be inferred that power has been lost at terminal 19. Sensor 17 is seen as comprising a gate circuit formed of a current limiting resistor 66 and a transistor 69. In this embodiment, resistor 66 provides the voltage at terminal 19 to the base of transistor 69, the resistor 66 terminal connected to terminal 19 thus serving as one voltage input terminal to sensor 17. The emitter of transistor 69 is connected to terminal 40 and forms a second voltage input terminal for sensor 17. Should the voltage at terminal 19 fall to a level more than about one diode drop below that of terminal 40, transistor 69 begins to conduct. This is the situation where a power outage has occurred. In case of a power outage, voltage at terminal 19 will fall quite rapidly causing the voltage on connector 25 to rise to approximately the capacitor 22 voltage at terminal 40. This positive voltage on connector 25 and at a power status input terminal 72 of override circuit 20 comprises the power outage signal.

Override circuit 20 receives the power outage signal on path 25 at its power status input terminal 72. The voltage at terminal 72 is dropped through a resistor 74 and a diode 77 to a level compatible with the voltages provided by the control signal on paths 23 and 24 for comparators 119 and 120 after rectification by diode 81 or 93. The cathode of diode 77 is connected to the cathode of diode 81 at junction 83. When the power outage signal is present, the voltage at terminal 40 pulls up the voltage at junction 83 to cause the voltage at output terminal 122 to become positive. Diodes 77 and 81 create in essence a wired OR situation at junction 83, at which the voltage will always be the higher of the two voltages at the anodes of diodes 77 and 81. The voltage which the power outage signal acting through diode 77 creates at junction 83 comprises a first part of an override signal provided to control circuit 27 by override circuit 20. At the same time, the voltage at junction 83 is further dropped by the voltage divider comprising resistors 91 and 102, and this divided voltage is applied to the base of an NPN transistor 98. The collector and emitter of transistor 98 are placed across resistor 107 with the emitter connected to ground such that when the voltage on its base rises due to the presence of the power outage signal on path 25, transistor 98 impedance drops to a very low level. Resistor 107 is shorted by the low impedance of transistor 98 which pulls the +input terminal of comparator 120 to near zero volt and below the divider voltage supplied to the −input terminals of the comparators. The ground level voltage which transistor 98 applies to the +terminal of comparator 120 forms a second part of the override signal provided by override circuit 20. Thus, the power outage signal applied to override circuit 20 forces the voltage at terminal 122 to its most positive level and the voltage at terminal 123 to near zero volt, irrespective of the voltages applied to control terminals 23 and 24.

One can see that when a power outage signal is not present on path 25, diode 77 allows the signals on paths 23 and 24 to control the operation of the motor in the normal fashion described above. When the power outage signal's relatively high DC voltage is applied to the override circuit 20 on path 25, the voltage on the +input terminal of comparator 119 is higher than the voltage on the −input terminal. Accordingly the positive DC voltage level is present on path 122, and transistor 132 conducts. At the same time, the lower positive DC voltage applied to the base of transistor 98 causes it to conduct, pulling the voltage at the +input terminal of comparator 120 to below the voltage at the −input terminal thereof. This produces the zero volt level at the output terminal of comparator 120, and transistor 134 also conducts. The reader can see that this is the same condition as that which exists when the motor 32 is commanded to drive in the counterclockwise direction. The charge stored in capacitor 22 is conducted by diodes 124 and 125 and these conducting transistors 132 and 134 to motor 32, causing its shaft to turn in the counterclockwise direction.

Thus, when power is lost at terminal 19 for any reason, the voltage condition created across diode 18 is detected by sensor 17 and motor 32 is driven by the charge stored in capacitor 22 in the counterclockwise direction. As mentioned above, capacitors currently available are capable of storing sufficient charge to drive a small motor for at least several tens of seconds at normal torque loads. This is adequate to return to -a preferred position, most devices controlled by the actuator of which the capacitor and motor is a part. One can also see that the direction of return on power outage is strictly a matter of choice, and can be changed by something as simple as reversing the power leads at motor 32.

The embodiments of an invention in which an exclusive property or right is claimed are defined as follows:

1. In a mechanical actuator of the type having an electrically powered drive mechanism and an output element continuously movable toward either of first and second extreme positions responsive to electrical actuator power of first and second types respectively supplied to the drive mechanism, a power supply for providing electrical power across first and second power terminals, and a control circuit having a control terminal and receiving electrical power from the power supply's power terminals for converting electrical power from the power supply responsive to an externally provided control signal received at the control terminal and having first and second states, respectively into electrical actuator power of the first and second types and for supplying the electrical actuator power to the drive mechanism, an improvement for providing power of the first type to the drive mechanism in the absence of power from the power supply, comprising a) a diode junction having a first terminal connected to the first power supply terminal, and a second terminal;
   b) a capacitor connected between the diode junction's second terminal and the power supply's second terminal;
   c) connectors providing power provided at the capacitor terminals to the control circuit; and
   d) a sensor connected to detect presence of power supplied by the power supply, and providing a power out signal responsive to absence of power from the power supply, said sensor including sensing terminals connected across the diode junction and a gate circuit, said gate circuit providing voltage from the capacitor to a sensor output terminal responsive to capacitor voltage exceeding power supply voltage at the diode junction, said capacitor voltage level comprising the power outage signal;

and wherein the control circuit further comprises an override circuit receiving the power outage signal, and responsive thereto converting power from the capacitor into power of the first type and supplying said power of the first type to the drive mechanism, said override circuit including a converter circuit connected to the sensor output terminal and converting the power outage signal into the first state of the control signal and applying said first state of the control signal to the control terminal.

2. The mechanical actuator of claim 1, wherein the diode junction comprises a diode.

3. The mechanical actuator of claim 2, wherein the gate circuit comprises a transistor receiving at two of its terminals the voltage across the diode junction, and at a third of its terminals supplying the capacitor voltage as the power outage signal, and wherein the converter circuit comprises a diode providing the power outage signal at the third terminal of the transistor to the control terminal.

4. The mechanical actuator of claim 3, wherein the control circuit is connected to receive power from the capacitor.

5. The mechanical actuator of claim 4, comprising a diode applying the power outage signal to the control terminal of the control circuit.

6. The control circuit for the mechanical actuator of claim 1, wherein the override circuit receives operating power from the capacitor.

7. In a mechanical actuator of the type having an electrically powered drive mechanism and an output element continuously movable toward either of first and second extreme positions responsive to electrical actuator power of first and second types respectively supplied to the drive mechanism, a power supply for providing electrical power across first and second power terminals, and a control circuit having a control terminal and receiving electrical power from the power supply's power terminals for converting electrical power from the power supply responsive to an externally provided control signal received at the control terminal and having first and second states, respectively into electrical actuator power of the first and second types and for supplying the electrical actuator power to the drive mechanism, an improvement for providing power of the first type to the drive mechanism in the absence of power from the power supply, comprising a) a diode junction having a first terminal connected to the first power supply terminal, and a second terminal;
   b) a capacitor connected between the diode junction's second terminal and the power supply's second terminal;
   c) connectors providing power provided at the capacitor terminals to the control circuit;
   d) a sensor connected to detect presence of power supplied by the power supply, and providing a power out signal responsive to absence of power from the power supply; and
   e) an override circuit receiving the power outage signal at a power status input terminal thereof, and responsive thereto providing an override signal to the control circuit's control terminal forcing the control signal received by the control circuit at its control terminal into the control signal's first state.

8. The mechanical actuator of claim 7, wherein the control circuit provides power of the first type responsive to a first state of the control signal applied to a control terminal of the control circuit; wherein the sensor includes sensing terminals connected across the diode junction and a gate circuit, said gate circuit providing voltage from the capacitor to a sensor output terminal responsive to capacitor voltage exceeding power supply voltage at the diode junction, said capacitor voltage level comprising the power outage signal; and wherein the override circuit includes a converter circuit connected to the sensor output terminal and converting the power outage signal into the first state of the control signal and applying said first state of the control signal to the control terminal.

9. The mechanical actuator of claim 7, wherein the gate circuit comprises a transistor receiving at two of its terminals the voltage across the diode junction, and at a third of its terminals supplying the capacitor voltage as the power outage signal, and wherein the converter circuit comprises a diode providing the power outage signal at the third terminal of the transistor to the control terminal.

10. The mechanical actuator of claim 8, wherein the control circuit is connected to receive power from the capacitor.

11. The mechanical actuator of claim 9, comprising a diode applying the power outage signal to the control terminal of the control circuit.

\* \* \* \* \*